B. J. DICKINSON.
HOSE COUPLING.
APPLICATION FILED NOV. 10, 1911.
1,033,554.
Patented July 23, 1912.
2 SHEETS—SHEET 1.
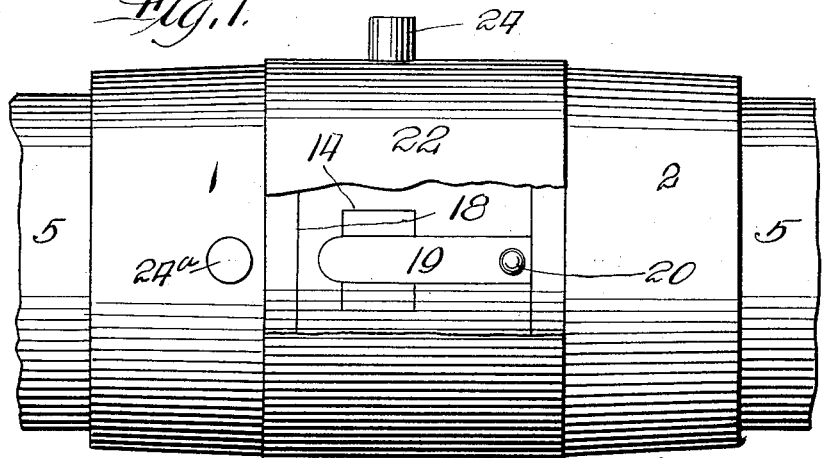
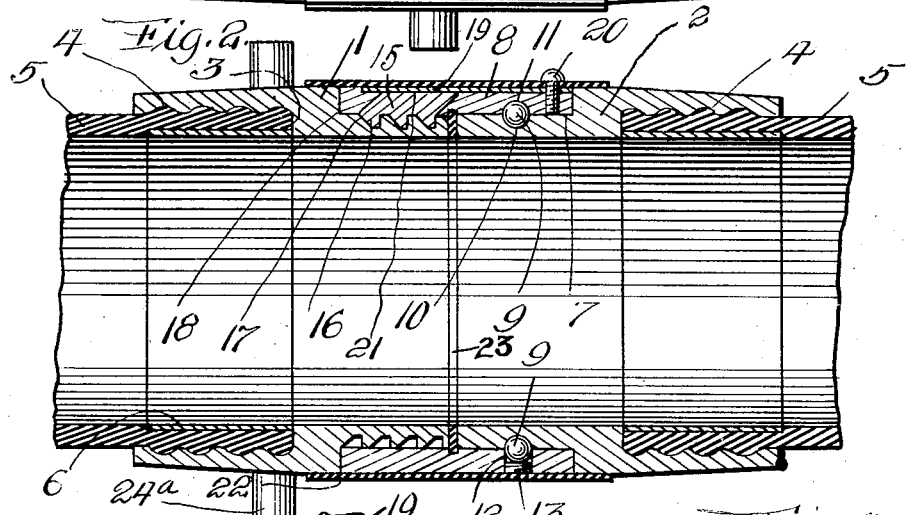
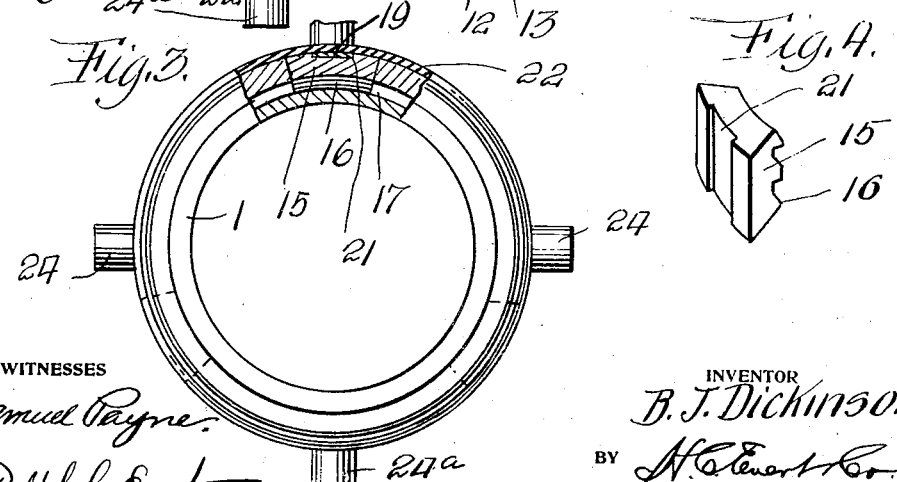
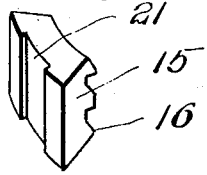
WITNESSES
INVENTOR
B. J. Dickinson
BY
ATTORNEYS B. J. DICKINSON.
HOSE COUPLING.
APPLICATION FILED NOV. 10, 1911.
1,033,554.
Patented July 23, 1912.
2 SHEETS—SHEET 2.
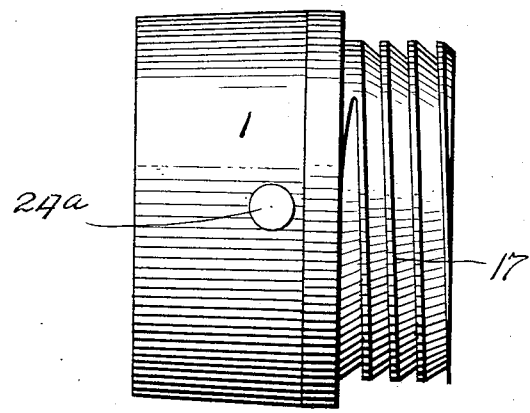
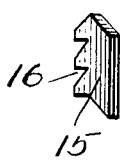 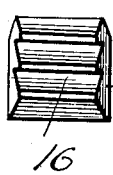 
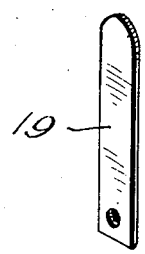
WITNESSES
Samuel Payne
Ralph C. Evert
INVENTOR
B. J. Dickinson.
BY
ATTORNEYS
COLUMBIA PLANOGRAPH CO., WASHINGTON, D. C.

UNITED STATES PATENT OFFICE.

BRUCE JOHN DICKINSON, OF AMBRIDGE, PENNSYLVANIA.

HOSE-COUPLING.

1,033,554.  Specification of Letters Patent.  Patented July 23, 1912.

Application filed November 10, 1911. Serial No. 659,632.

*To all whom it may concern:*

Be it known that I, BRUCE JOHN DICKINSON, a citizen of the United States of America, residing at Ambridge, in the county of Beaver and State of Pennsylvania, have invented certain new and useful Improvements in Hose-Couplers, of which the following is a specification, reference being had therein to the accompanying drawing.

This invention relates to hose couplers, and the primary object of my invention is the provision of positive and reliable means, in a manner as will be hereinafter set forth, for easily and quickly connecting the confronting ends of two sections of hose or a section of hose to a fire plug or hydrant.

Another object of this invention is to provide a hose coupler that obviates the necessity of using a wrench or resorting to the use of screw threads for obtaining a non-leakable connection between hose or other fluid conduits.

A further object of this invention is to provide a hose coupler that is inexpensive to manufacture, not liable to injury by ordinary use, and highly efficient for the purposes for which it is intended.

With the above and other objects in view the invention resides in the novel construction, combination and arrangement of parts to be hereinafter specifically described and then claimed.

Reference will now be had to the drawing, wherein:—

Figure 1 is a plan of the hose coupler partly broken away. Fig. 2 is a longitudinal sectional view of the same. Fig. 3 is an end view of the coupler partly broken away and partly in section. Fig. 4 is a perspective view of a detached locking member adapted to form part of the coupler. Fig. 5 is a plan of one of the coupling members. Figs. 6, 7 and 8 are detail views of one of the locking members, and Fig. 9 is a perspective view of a detached spring.

A coupler in accordance with this invention comprises members 1 and 2 having tapering ends with the outer end of said members recessed, as at 3 and the walls of said recesses scolloped, corrugated or provided with irregular surfaces 4 to frictionally hold the ends of sections of hose 5. The ends of the hose 5 engage the inner ends of the recesses 3 and are forced into engagement with the walls of said recesses by expansible bands 6, preferably made of copper whereby the bands can be hammered or otherwise expanded to force the material of the hose into the corrugated or irregular walls of the recesses 3. This is accomplished in a manner that counter-sinks the bands 6 and provides a smooth bore from one hose section to the other.

The member 2 has the inner end thereof provided with an annular exterior seat 7 for a coupling member 8 that is movably held relatively to the member 2 by anti-frictional balls 9. These balls engage in an annular race 10 provided therefor in the member 2 and in an annular race 11 formed in the coupling member 8, the race 11 confronting the race 10 to receive the balls 9. The anti-frictional balls are placed within the races through the medium of an opening 12 in the member 8, said opening being normally closed by a plug 13.

The member 8 is provided with inclined equally spaced openings 14 rectangular in plan and these openings receive locking members 15 having beveled teeth 16 to engage in annular grooves 17 provided therefor in the reduced inner end of the member 1, said member being reduced to provide an annular seat 18 for the end of the coupling member 8.

The locking members 15 are retained within the openings 14 by flat springs 19 countersunk within the outer surface of the member 8 and retained therein by set screws 20. The outer ends of the locking members are cut away, as at 21 to receive the free ends of the springs 19.

The screws 20 retain a yieldable band 22 upon the member 8 with the ends of the band extending on to the members 1 and 2. This band is preferably made of rubber and is employed to prevent the springs 19 from crystallizing or deteriorating due to the forces of nature, moisture and rough usage to which the coupler is subjected.

Interposed between the confronting ends of the members 1 and 2 is a resilient gasket 23, preferably made of rubber, said gasket insuring a non-leakable connection between the members 1 and 2.

In practice, it is only necessary to spring the coupling member 8 into engagement with the member 1 and to make sure of the locking members 15 engaging the member 1, a slight rotation of the member 2 relatively to the member 1 firmly seats said coupling member with the teeth 16 thereof engaging in the grooves 17. The teeth 16 of the coupling member are protected as they project inwardly from the coupling member 8 and cannot be injured when the end of the hose is dragged or rapidly moved over a street or rough surface. The member 8 can be freely revolved relatively to the member 2 and the parts of the member 2 can be easily assembled. Irrespective of the position of the member 2 relatively to the member 1 the end of the coupling member 8 can be sprung into engagement with the reduced end of the member 1. The coupling member 8 has oppositely disposed pins 24 projecting through the rubber band or sleeve 22 to facilitate moving said coupling member to firmly seat the locking members. The member 1 has pins 24ª to facilitate moving said member.

The coupler members can be made of light and durable material, as brass and the coupler in its entirety can be made of various sizes.

What I claim is:—

A hose coupler comprising members adapted to have the ends of sections of hose connected thereto, a coupling member revolubly mounted upon one of the first mentioned members, spring pressed locking members equally spaced in said coupling member and adapted to engage in the reduced end of the other first mentioned member, and a yieldable band carried by said coupling member and extending on to the first mentioned members.

In testimony whereof I affix my signature in the presence of two witnesses.

BRUCE JOHN DICKINSON.

Witnesses:
 FRANK W. PRATT,
 ANDREW LIGHTBODY.

Copies of this patent may be obtained for five cents each, by addressing the "Commissioner of Patents, Washington, D. C."